United States Patent [19]

O'Neal

[11] Patent Number: 4,527,826
[45] Date of Patent: Jul. 9, 1985

[54] CONVERTIBLE TRAILER APPARATUS

[76] Inventor: John L. O'Neal, 24982 Thompson Rd., Perrysburg, Ohio 43551

[21] Appl. No.: 522,745

[22] Filed: Aug. 12, 1983

[51] Int. Cl.³ .............................................. B60P 3/42
[52] U.S. Cl. .................................... 296/3; 105/238 R; 105/355; 296/10; 410/34; 410/41; 410/150
[58] Field of Search .................... 410/2, 31, 32, 34, 38, 410/41, 52, 54, 55, 96, 97, 99, 100, 127, 128, 150; 105/243, 355, 363, 375, 380, 390, 238 R; 296/3, 10; 280/656; 211/41

[56] References Cited

U.S. PATENT DOCUMENTS

| 773,239 | 10/1904 | Stone | 296/10 |
|---|---|---|---|
| 1,830,785 | 11/1931 | Elmer | 105/363 X |
| 2,100,971 | 11/1937 | McDonald | 296/3 |
| 2,636,772 | 4/1953 | Bridge | 296/10 X |
| 2,940,402 | 6/1960 | Hansen et al. | 296/3 X |
| 3,034,454 | 5/1962 | Tatarchuk | 105/355 X |
| 3,848,917 | 11/1974 | O'Neal | 296/3 |
| 3,878,942 | 4/1975 | Hansen et al. | 206/454 |
| 4,037,870 | 7/1977 | O'Neal | 296/3 |
| 4,195,738 | 4/1980 | O'Neal | 211/41 |
| 4,273,485 | 6/1981 | Fischer et al. | 410/34 |
| 4,385,856 | 5/1983 | O'Neal | 410/34 |

Primary Examiner—Randolph Reese
Attorney, Agent, or Firm—David D. Murray; Richard S. MacMillan

[57] ABSTRACT

A trailer apparatus includes movable and demountable structures which adapt the trailer for use with large planar sheets of material as well as more conventional loads such as cartons, drums and palletized articles. The trailer includes a plurality of parallel A-frame supports spaced longitudinally along the central portion of the trailer for receiving the planar material. Transversely oriented bars longitudinally restrain the material and straps extending downwardly from the top of the support laterally restrain it. The upper portion of the A-frame supports, as well as the bars and straps are removable. A pair of hinged panels selectively form a trailer floor in the central portion thereof. The sidewalls of the trailer are fixed. The roof is movable to permit loading and unloading of the planar material from above and conventional rear trailer doors provide access therethrough for loading and unloading conventional cargo such as palletized material, cartons, and drums.

15 Claims, 8 Drawing Figures

CONVERTIBLE TRAILER APPARATUS

BACKGROUND OF THE INVENTION

The invention relates generally to transportation apparatus and more specifically to a trailer which is adaptable to receive both large planar sheets of material as well as more conventional loads.

One current architectural trend emphasizes the extensive of use of glass. The spaciousness, natural lighting and occasionally scenery provided by glass panels is diminished by interrupting supports and thus many designs require large uninterrupted or minimally interrupted periods of glass often as great as 12 by 20 feet and occasionally larger. Given the current emphasis on energy conservation, the glass panels are frequently of double wall construction having an insulating layer of air or a vacuum in the space between. Not only do such double thickness insulated glass panels weigh approximately twice as much as their single panel counterparts, but also they are substantially more fragile.

The capital investment in machinery capable of manufacturing such large glass panels, particularly those having double walls and an evacuated region therebetween, is of such a magnitude that they are typically manufactured in only a limited number of locations. Frequently, therefore, they must be transported over long distances to the building in which they will be utilized.

I have developed several patented designs for transporting such glass sheets or panels. U.S. Pat. No. 3,848,917 discloses a trailer having pivoted, extensible arms and longitudinal beams which restrain the glass sheets. Another one of my designs is taught in U.S. Pat. No. 4,037,870 which discloses a trailer having a rigid A-frame and a plurality of clamping devices for restraining the glass sheets against both transverse and longitudinal movement. U.S. Pat. No. 4,195,738 also teaches a trailer having a plurality of centrally disposed rigid A-frame members. Lateral and longitudinal restraints which utilize a special adjustable interconnecting member accommodate various sizes of glass sheets. My most recent design, disclosed in U.S. Pat. No. 4,385,856 illustrates another A-frame trailer design in which lateral restraint of the glass panels is achieved by readily adjustable cargo straps.

While the above-noted devices each represent significant improvements in planar material transport apparatus, their task-specific design poses one significant economic problem. As noted previously, such trailers will typically transport glass from a manufacturing facility to a building site. They seldom return with a load; not only because of the obvious reason that this type of cargo typically only flows from the nearest manufacturing site to a building site but also because the trailers are relatively ill-adapted to transporting other cargo. In such a situation, every trailer travels one half of each journey in an unloaded condition. For the operator of such vehicles, this situation has become increasingly costly as fuel, user fees and wages have continued to increase.

SUMMARY OF THE INVENTION

The instant invention is directed to an apparatus for transporting both planar material such as glass sheets and panels and more conventional loads such as cartons, drums and palletized material. While it is outfitted and primarily designed for the transportation of glass panels, the demountable and movable structures of the trailer permit it to function with equal efficiency as a conventional trailer. The trailer includes a plurality of parallel, spaced-apart A-frame supports disposed in the central portion of the trailer along its longitudinal center line. At the foot of each A-frame member is an outwardly extending support beam which is oriented at a right angle to the adjacent A-frame member. Planar material such as glass panels are thus cradled in the A-frame members of the trailer. Lateral restraint of the material is provided by cargo straps which extend from the apices of the A-frame members to each associated beam. The material is longitudinally restrained by transversely oriented and longitudinally adjustable beams.

The upper portions of each of the A-frame members as well as the transversely oriented bars and support straps are removable when conversion of the trailer from planar material hauling to conventional cargo hauling is required. A pair of hinged panels having longitudinal pivot axes generally aligned with the floor and outer edge of the trailer provide flooring over the central portion of a trailer when lowered into place. A subframe having a plurality of transversely oriented beams provides support for the hinged panels in their lowered postion. The front and sidewalls of the trailer are fixed. Access to the trailer for loading and removal of glass panels is achieved through a removable roof which may be a canvas tarp or may constitute a plurality of metal and fiberglass panels. Conventional rear trailer doors provide access into the trailer for loading and removal of conventional loads.

It is thus an object of the instant invention to provide a trailer which may be readily adapted to transport large planar materials such as glass as well as conventional cargo.

It is a further object of the instant invention to provide a trailer which may be readily converted from a first configuration intended to transport planar sheets of material into a second configuration intended to transport convention bulk cargo.

It is a still further object of the instant invention to provide a trailer which efficiently and economically transports either large planar sheets of material or conventional bulk cargo such as cartons, drums or palletized articles.

Further objects and advantages of the instant invention will become apparent by reference to the following description of the preferred embodiment and appended drawings.

DESCRIPTION OF THE PREFERRED EMBODIMENT

Figure 1:
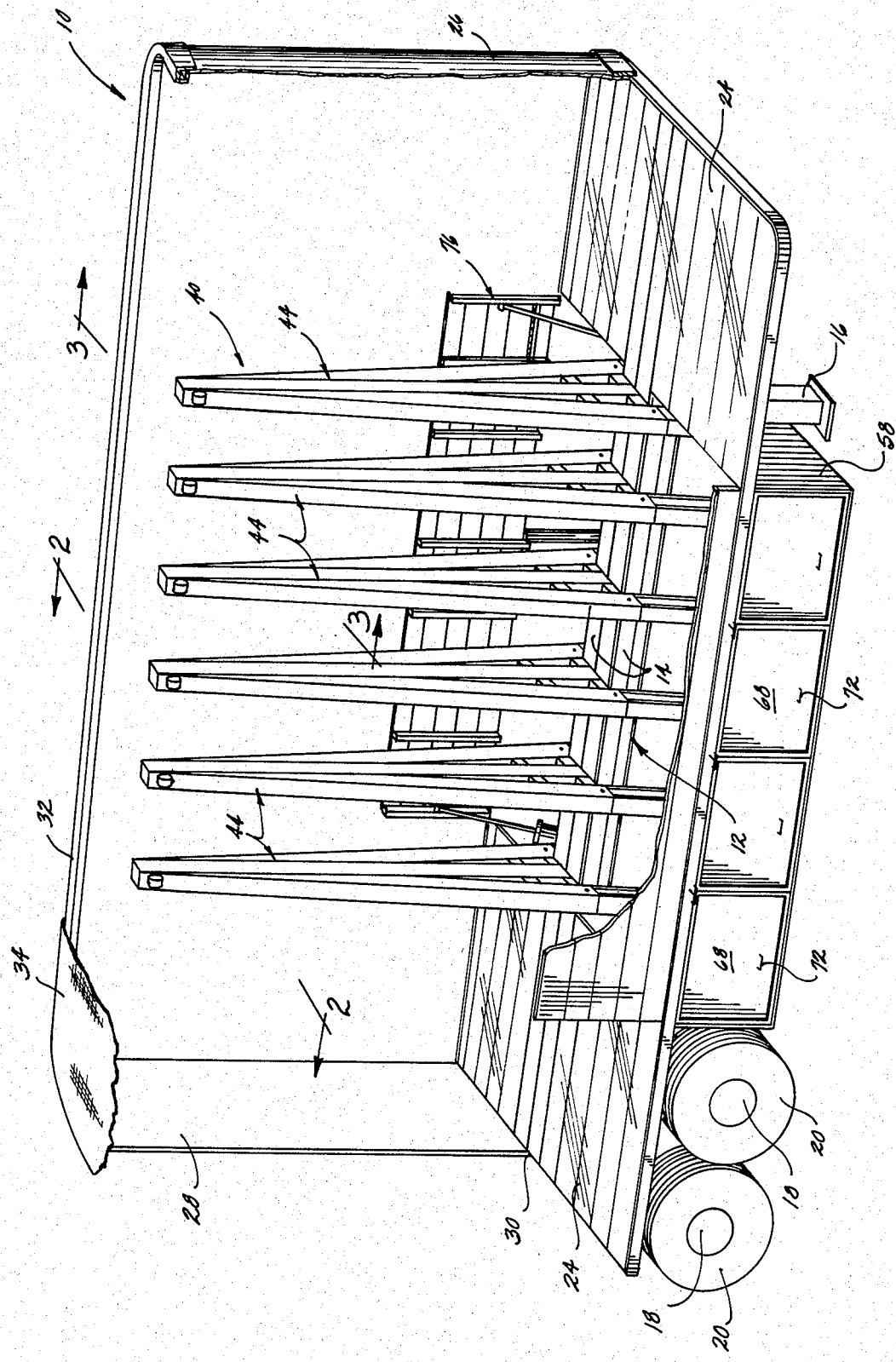
FIG. 1 is a perspective view with portions broken away of a trailer apparatus according to the instant invention.
Figure 2:
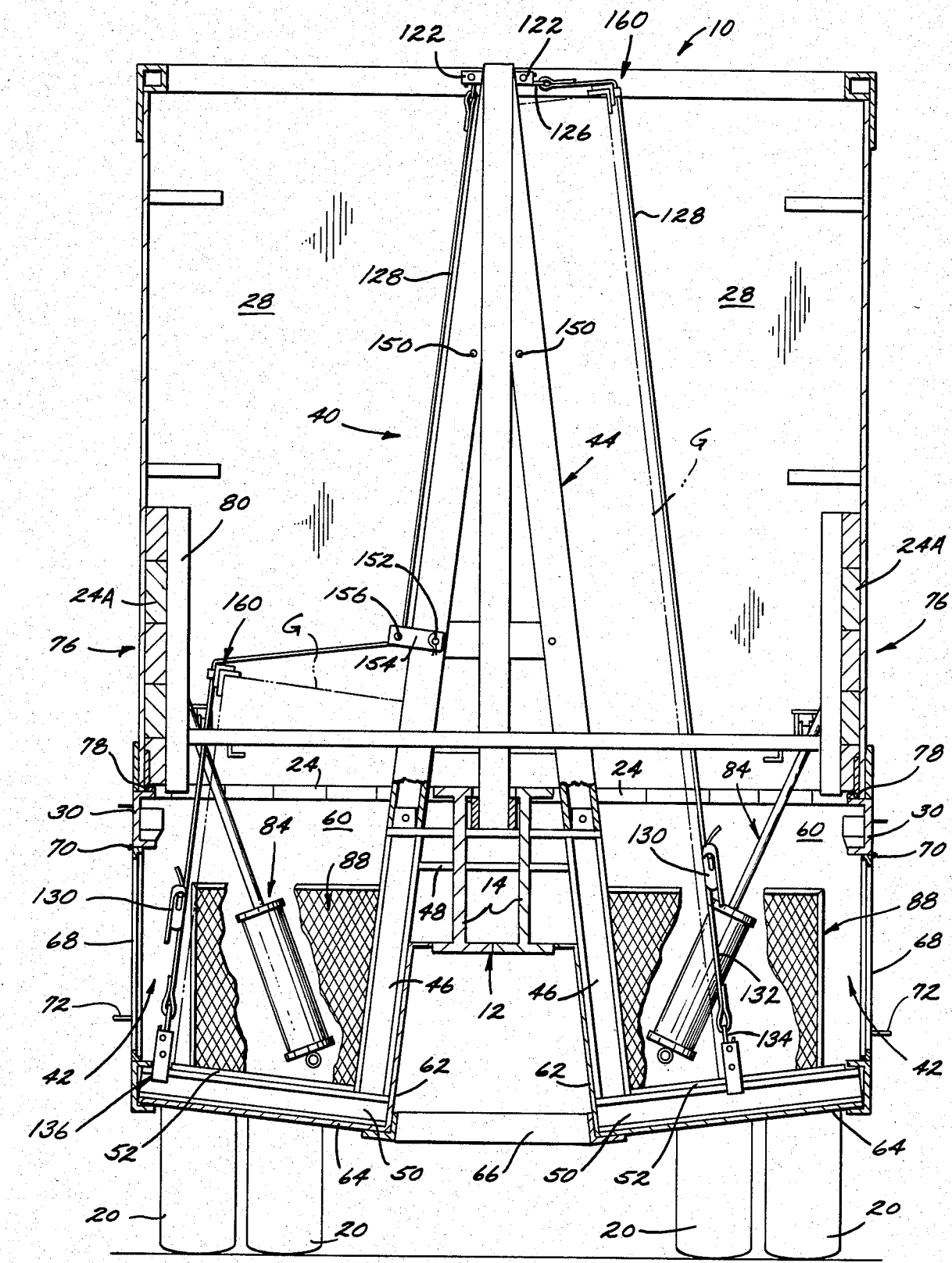
FIG. 2 is a full sectional view of a trailer apparatus according to the instant invention taken along line 2—2 of FIG. 1.

Referring now to FIGS. 1 and 2, a trailer apparatus according to the instant invention is illustrated and generally designated by the reference numeral 10. The trailer apparatus 10 is designed to receive large planar sheets of material such as glass, transport such material from one location to another and be convertible into a substantially conventional trailer having a flat floor suitable for receiving any objects conventionally transported by a trailer on the return trip. The trailer apparatus 10 includes a centrally disposed longitudinally extending central frame 12 which may comprise a pair of adjacently disposed and interconnected I-beams 14. The frame 12 generally provides strength and rigidity to the entire trailer apparatus 10. On the lower, forward portion of the trailer apparatus 10 and secured to the frame 12 is disposed a king pin (not illustrated) as well as a pair of movable jack stands 16. Both the king pin and the jack stands 16 function in a conventional manner and will therefore not be further described. In the rear portion of the trailer apparatus 10, axle and brake assemblies 18 which are secured to the frame 12 rotatably support tires and wheels 20. The frame 12 supports a plurality of transverse members (not illustrated) which in turn support flooring 24 in the forward and rearward portion of the trailer apparatus 10. The flooring 24 is preferably a tough relatively light weight material such as a fiberglass reinforced plastic resin material or more conventional material such as wood. Disposed about the sides and forward portions of the periphery of the trailer assembly 10 are vertical wall panels 26. The vertical wall panels 26 likewise may be fabricated of any suitable water proof and relatively light weight materials such as wood, plywood, fiberglass or fiberglass reinforced plastic or aluminum. At the end of the trailer, a pair of conventional hinged and lockable doors 28, one of which is illustrated in FIG. 1, provides access to the interior of the trailer apparatus 10 in accordance with conventional practice. The doors 28 are hinged along the line of intersection with the side panels 26 and include latching mechanisms (not illustrated) which secure them to each other as well as to a lower peripheral frame rail 30 and an upper peripheral frame rail 32. The peripheral frame rails 30 and 32 are preferably fabricated of metal and the upper rail 32 reinforces the upper ends of the wall panels 26 as well as provides a situs for securement of a flexible covering such as a tarp 34 which may be selectively secured over the open top of the trailer apparatus 10. Alternatively, the top of the trailer apparatus 10 may constitute a plurality of, for example, aluminum, fiberglass or fabric and frame panels slidably disposed in tracks which provide selective access to the trailer apparatus 10 from the top.

Disposed centrally along the middle portion of the trailer apparatus 10 are a plurality of A-frame assemblies 40. The A-frame assemblies 40 extend generally from the top of the trailer apparatus 10 as defined by the upper peripheral frame rail 32 in a downward and diverging orientation into a pair of compartments 42 disposed on opposite sides of the frame 12. The A-frame assemblies 40 are separable into an upper triangular section 44 and collinear support members 46 as will be more fully described subsequently. The support members 46 are secured to the I-beams 14 of the frame 12 by a respective plurality of transversely oriented spacing supports 48. The members 46 and spacing supports 48 as well as other structural members of the trailer apparatus 10 are preferably steel beams and thus are most readily assembled or secured to one another by welding. Clearly, however, other materials such as aluminum and fastening means such as rivets or bolts and nuts are wholly suitable and may be utilized. Disposed at the foot of each of the support members 46, and oriented perpendicularly thereto, are a respective plurality of outwardly extending I-beam arms 50. On the upper surface of each of the arms 50 is secured a relatively stiffly resilient cushioning material 52 such as rubber. Almost the entire weight of a load G such as glass panels will be supported on the I-beam arms 50 and thus the resilient material 52 provides a desirable resilient support therefore.

The compartments 42 are disposed below the level of the flooring 24 and their forward limits are defined by a pair of irregularly shaped plates 58 (illustrated in FIG. 3) and there rearward limits are defined by a pair of irregularly shaped plates 60. The inner and bottom walls of the compartments 42 are defined by the obliquely disposed, longitudinally extending panels 62 and longitudinally extending panels 64 disposed perpendicularly to the panels 62, respectively. All of the just recited structures, particularly the panels 62 and 64 serve to seal off the compartments 42 and protect the cargo of the trailer apparatus 10 from water, flying objects such as stones and road debris and other undesirable substances such as dust. A plurality of transversely disposed braces 66 extend between the lower, innermost corners of the support members 46 and I-beam arms 50 which define the compartments 42.

Figure 3:
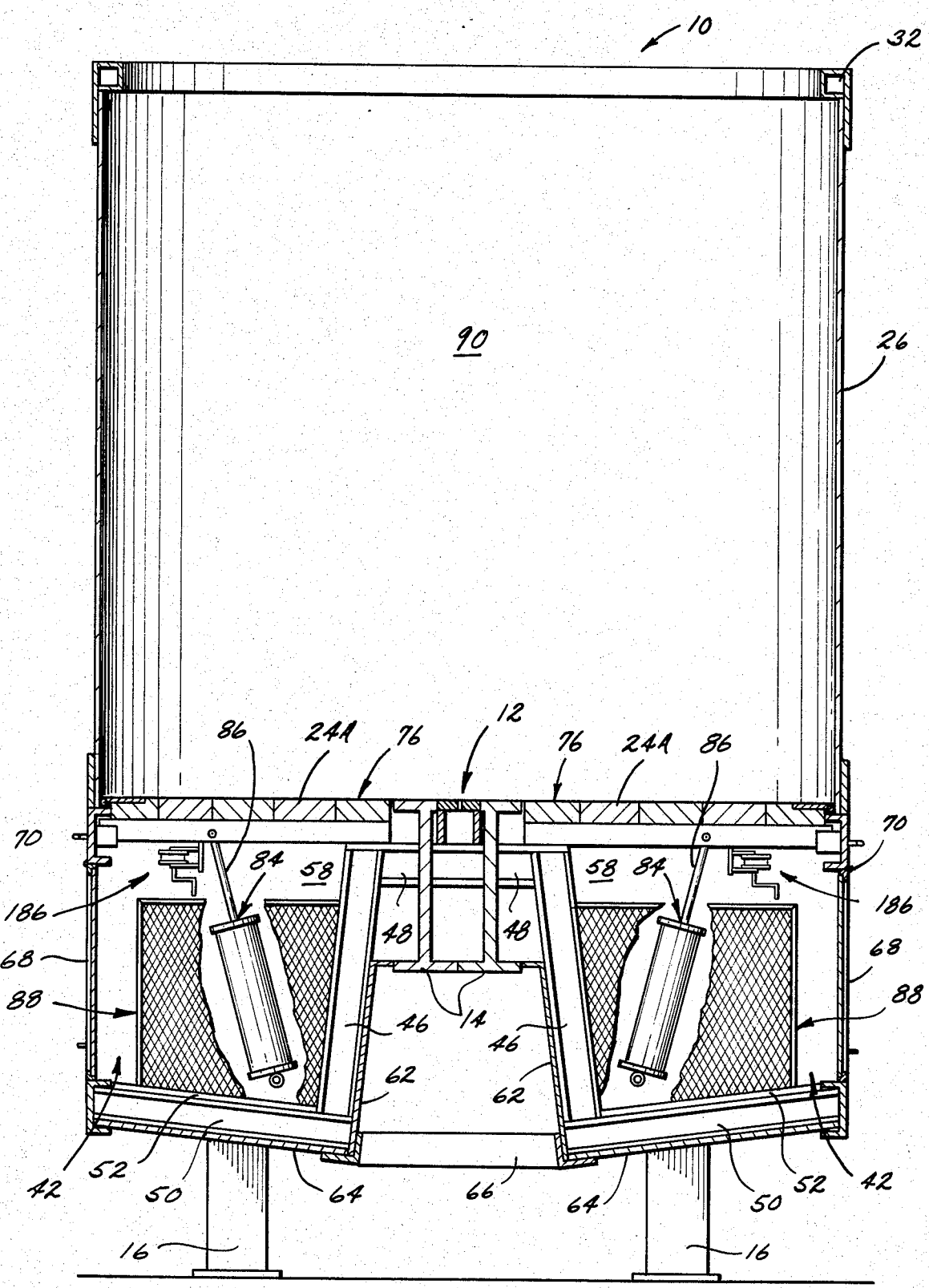
FIG. 3 is a full, sectional view of a trailer apparatus according to the instant invention taken along line 3—3 of FIG. 1 in which the glass or planar sheet transporting structures have been removed and the trailer has been converted to receive cargo.

The outside wall of each of the compartments 42 is defined by a plurality of access doors 68. The access doors 68 are pivoted along their upper, horizontal edges by suitable hinges 70 and may include handles 72 to facilitate purchase and opening of the access doors 68 by personnel, as well as latches (not illustrated) to maintain the doors 68 in the closed positions illustrated. Finally, the upper limits of the compartments 42 are defined by a pair of opposed, pivoted floor panel assemblies 76. Each of the pivoted floor panel assemblies 76 is secured to the lower peripheral frame rail 30 by a longitudinally extending hinge 78. The floor panel assemblies 76 each include a rectangular sub-frame 80 which may include a plurality of interconnected transversely disposed braces which support additional flooring 24A. Adjacent both ends of each of the assemblies 76 and pivotally secured between the sub-frame 80 and the forward irregular panels 58 or rearward irregular panels 60 are four hydraulic piston and cylinder assemblies 84. Preferably, the pivoted and therefore moving piston and cylinder assemblies 84 are disposed behind protective screen assemblies 88. The hydraulic piston and cylinder assemblies 84 communicate through hydraulic tubing with suitable control, pump and reservoir devices of a conventional nature which are not illustrated. The piston and cylinder assemblies are double acting and function in a substantially conventional manner. That is, application of pressurized hydraulic fluid to one side of internal pistons extends piston rods 86 and raises the assemblies 76 from the positions illustrated in FIG. 3 to that illustrated in FIG. 2. Conversely, application of pressurized hydraulic fluid to the opposite side of the pistons within the piston and cylinder assemblies 84 retracts the piston rods 86 and returns the assemblies 76 to the positions illustrated in FIG. 3. It should thus be appreciated that primarily as a result of these cooperating structures and this operation, the trailer apparatus 10 is converted from a substantially conventional cargo trailer having a voluminous uninterrupted interior 90 as illustrated in FIG. 3 into a trailer which defines the same interior 90 but which also extends into the compartments 42 on either side of the centrally disposed longitudinal frame 12.

Figure 4:
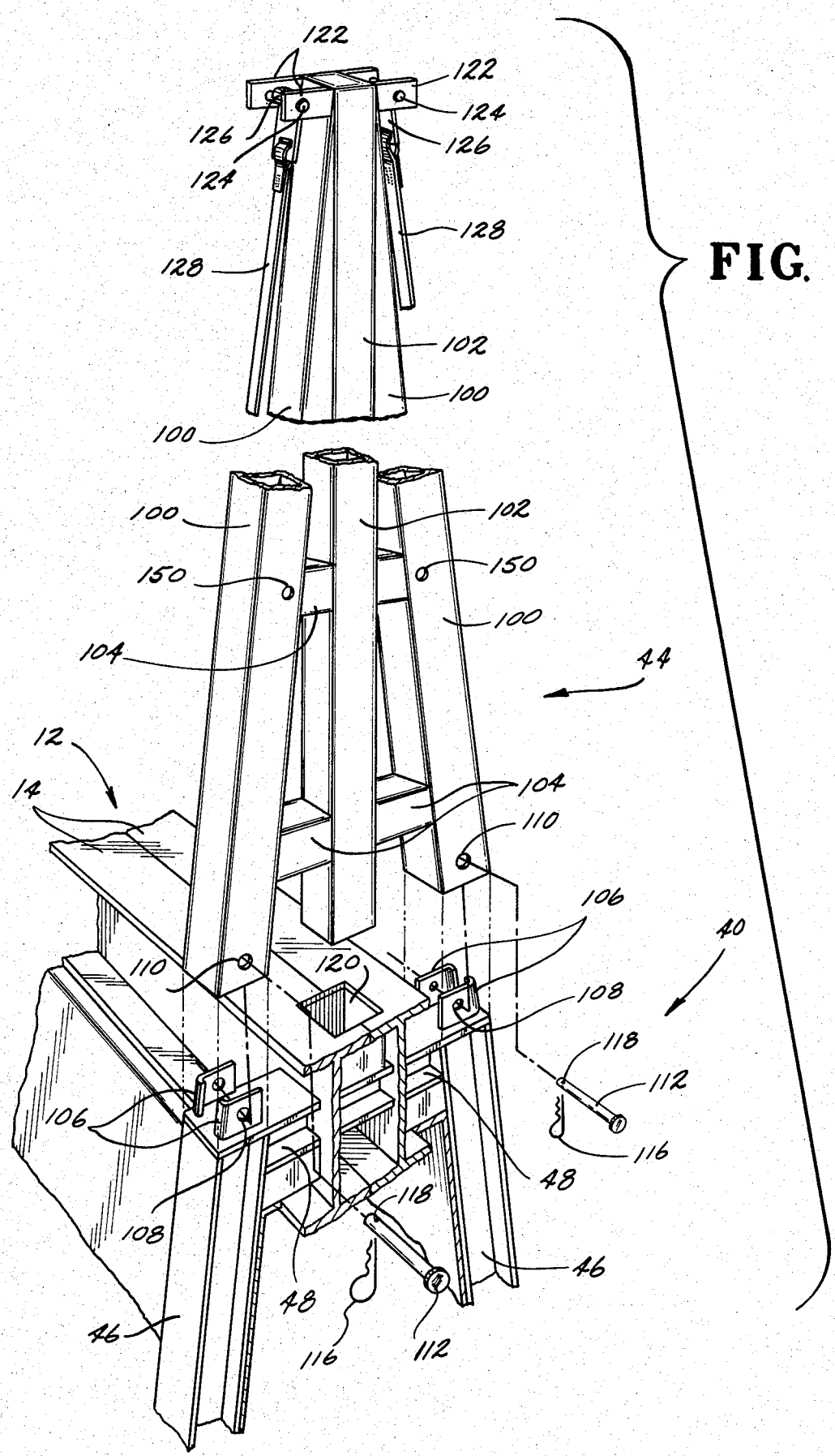
FIG. 4 is a perspective view of the transversely oriented lateral load restraint A-frame structure of a trailer apparatus according to the instant invention.
Figure 7:
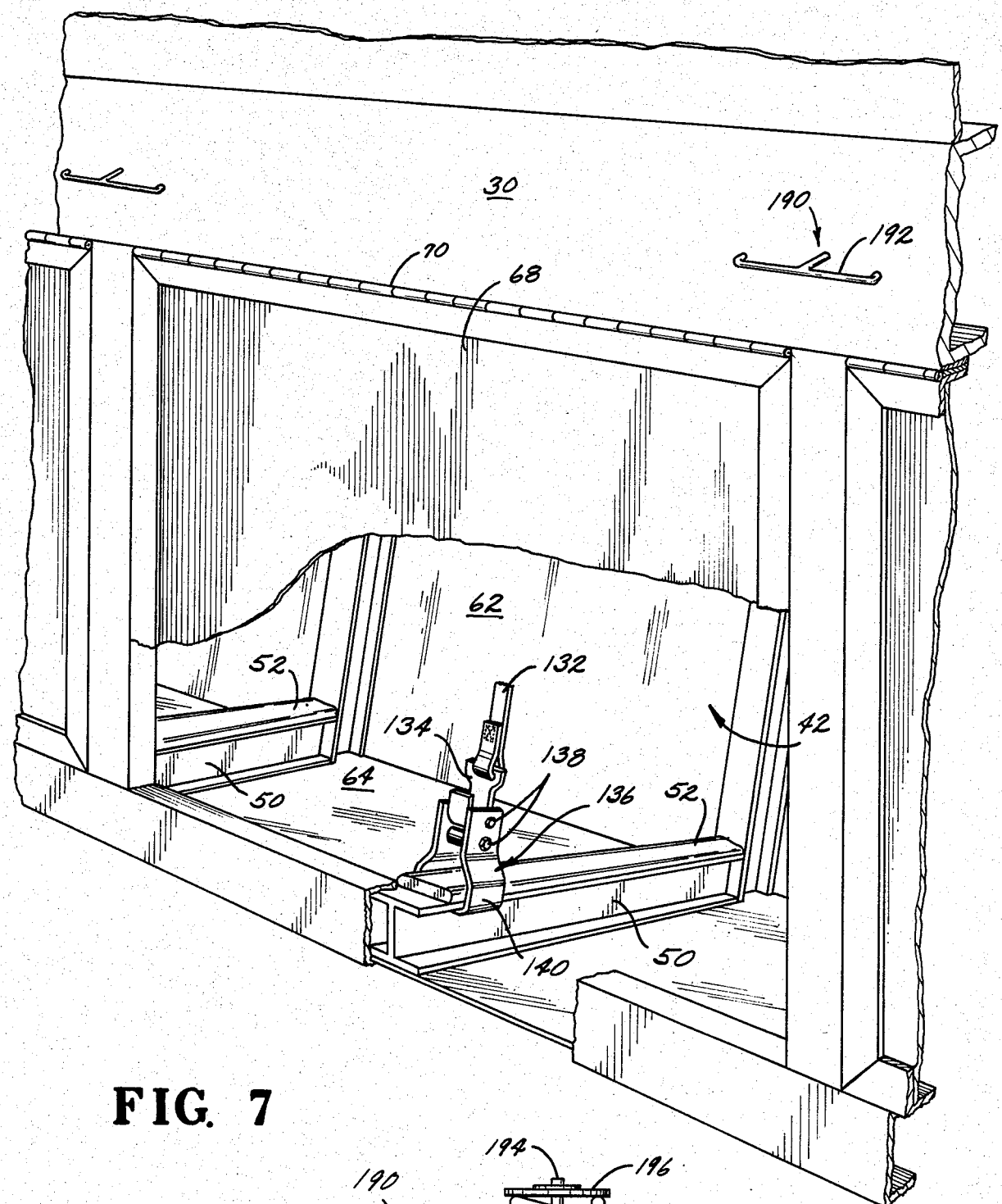
FIG. 7 is a fragmentary perspective view of the trailer access doors and latch mechanism associated therewith.

Referring now to FIGS. 2, 4, and 7, the A-frame assemblies 40 will be further described. Each of the A-frame assemblies 40, as noted, includes the upper triangular section 44 which comprises a pair of outer inclined box beams 100 and a vertically oriented center box beam 102. Pairs of horizontally disposed braces 104 extend between the center box beam 102 and outer box beams 100 to provide suitable rigidity to the upper section 44 of the A-frame assembly 40. All of the aforementioned components of the upper section 44 are preferably fabricated of aluminum in order to provide suitable strength while minimizing the weight of the structure.

As noted previously, the upper sections 44 of the A-frame assemblies 40 are demountable. This capability is facilitated by pairs of seating tabs 106. The seating tabs 106 are spaced apart such that the distance between their outer faces is equal to the corresponding internal dimension of the box beams 100 which therefore seat relatively securely thereover. The seating tabs 106 include aligned apertures 108 which, when the box beams 100 are seated thereover, align with apertures 110 disposed therein and receive complementarily sized retaining pins 112. The retaining pins 112 securely retain the upper sections 44 on the collinear support members 46 as will be readily appreciated. Spring clips 116 received within suitable radially oriented apertures 118 in the retaining pins 112 ensure retention of the pins 112 within the apertures 108 of the box beam members 100. Symmetrically disposed in the I-beams 14 in alignment with each pair of members 46 is a rectangular socket 120. The sockets 120 receive a respective one of the center box beams 102 of the upper triangular sections 44 and further enhance their rigid securement to the trailer frame 12.

At the top of each of the triangular sections 44, adjacent the outer faces of the outer box beams 100 are disposed two pairs of parallel outwardly directed ears 122. Rigidly secured to and extending between each pair of the ears 122 is a pin 124 which selectively receives a flat hook 126. The flat hook 126 in turn is secured to a cargo strap 128 which extends generally downwardly from the top of each of the sections 44 and is connected to a ratchet type cargo strap clasp 130. A second cargo strap 132 extends downwardly from the cargo strap clasp 130 and also terminates in a flat hook 134. A flat hook 134 is in turn selectively securable in a specially configured double hook assembly 136. The double hook assembly 136 comprises a pair of parallel bolts or pins 138, one of which is engaged by the flat hook 134, to which a pair of symmetrical J-shaped members 140, which, as arranged, resemble mirror-image question marks, are secured. Each of the J-shaped members 140 engages a respective side of one of the outwardly extending I-beam arms 50.

Finally, each of the outside box beams 100 preferably includes at least two pair of aligned apertures 150. The apertures receive a retaining pin 152 of a cargo strap restraining device consisting of a pair of parallel plates 154 secured to a transversely oriented pin 156. The plates 154 straddle the outer box beams 100 and the restraining device may be installed in an appropriate set of the apertures 150 to provide a restraining point of the cargo strap 128 below the top of the upper A-frame member 44. Suitable retaining means such as a spring cotter pin 158, may, of course, be utilized with the retaining pins 152. FIG. 2 illustrates use of the instant restraining device to improve the lateral restraint of the load G.

Figures 5, 6:
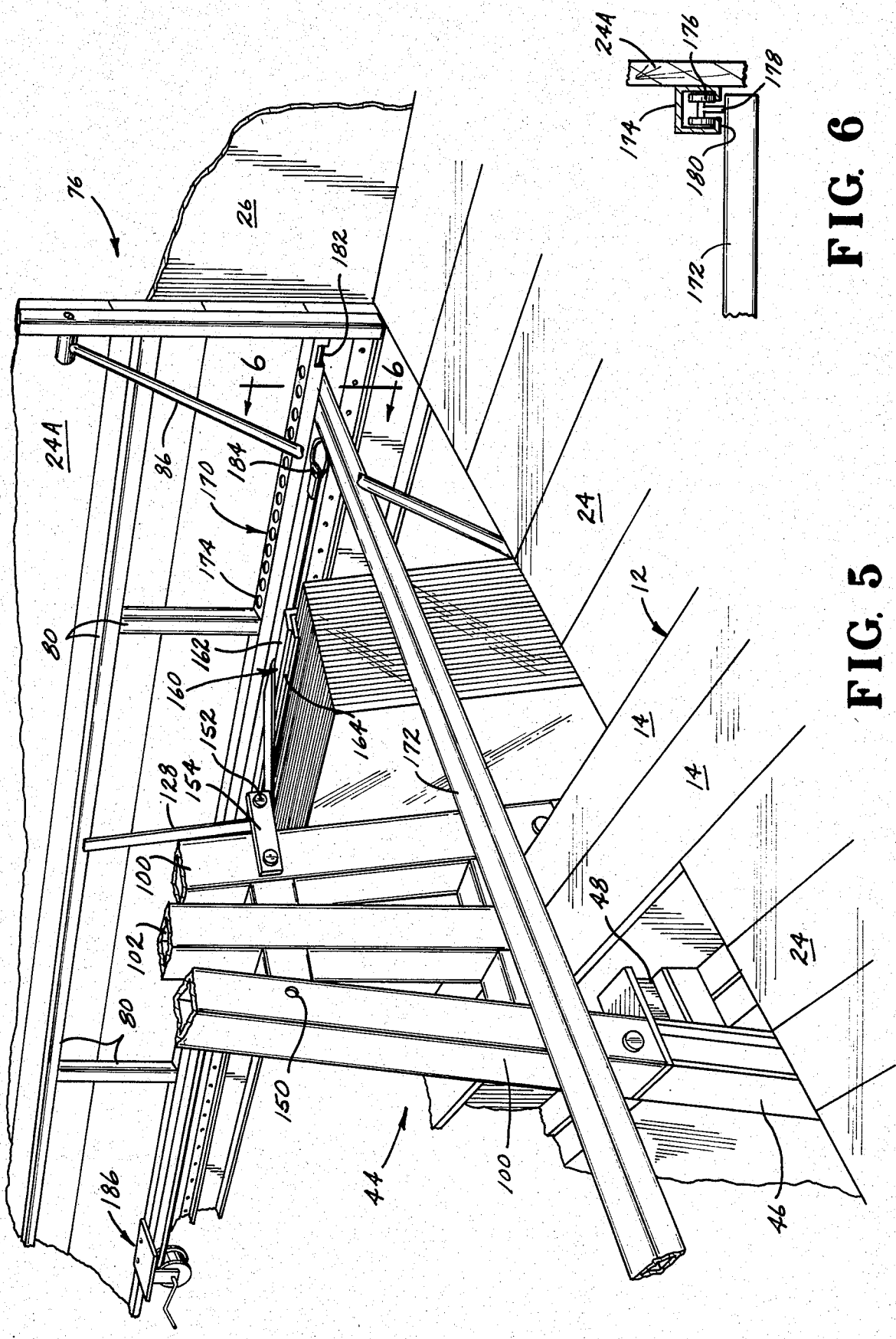
FIG. 5 is a perspective view of the central, planar material compartment, floor panels and longitudinal material restraint beam.
FIG. 6 is a fragmentary, sectional view of an end of the longitudinal material restraint beam and track.

Referring now to FIGS. 2 and 5, one final element of the lateral system of restraint utilized in the instant trailer apparatus is a corner guard assembly 160. The corner guard assembly 160 includes an angle member 162 fabricated of a material such as steel or aluminum which extends longitudinally along the load G and includes strips of resilient cushioning material 164 secured to the inside faces of the member 162. As illustrated in FIG. 2, the assemblies 160 are disposed in the upper outside corner of each load G or other material and are functionally disposed intermediate the cargo strap 128 and the load G in order to distribute the restraining forces applied to the load G by the cargo strap 128.

Longitudinal restraint of the loads disposed within the compartments 42 is achieved by a plurality of transversely oriented restraining beam assemblies 170, one of which will be described. Preferably, there are at least two such assemblies 170 to restrain the forward and rearward faces of a load G but additional such assemblies 170 may be included if several smaller loads are to be disposed within the compartments 42 of the trailer apparatus 10. Each of the restraining beam assemblies 170 includes a transversely oriented beam 172 which extends substantially the full internal width of the trailer apparatus 10. The beam 172 is received at each end in a longitudinally oriented track 174 and is supported for motion therealong by means of a pair of rotatable wheels 176 disposed on a carrier 178. The track 174 may form a portion of the sub-frame 80 of the panel assembly 76. The wheels 176 slide along a pair of parallel horizontal rails 180 formed in the truck 174. The transverse beam 172 is removable from the track 174 by passing the wheels 176 through an an access notch 182 disposed adjacent its end. Adjacent each end of the transverse beam 172 is removably secured a cargo strap 184 which may be reeled in and played out by a ratchet winch assembly 186. It should be appreciated that since a ratchet winch assembly 186 is associated with each of the cargo straps 184 and a cargo strap 184 is secured to each end of the transverse beam 172 at least four winch assemblies 186 are preferably utilized in a trailer apparatus 10 according to the instant design. Preferably, the ratchet winch assemblies 186 will likewise be secured to the sub-frame 80 of the assemblies 76. The ratchet winch assemblies 186 thus permit tightening of the cargo strap 184 and of the transverse beam 172 to secure a load G. This secure, tightened position may be maintained until the ratchet of the ratchet winch assembly 186 is released and tension in the cargo strap 184 likewise released.

Figure 8:
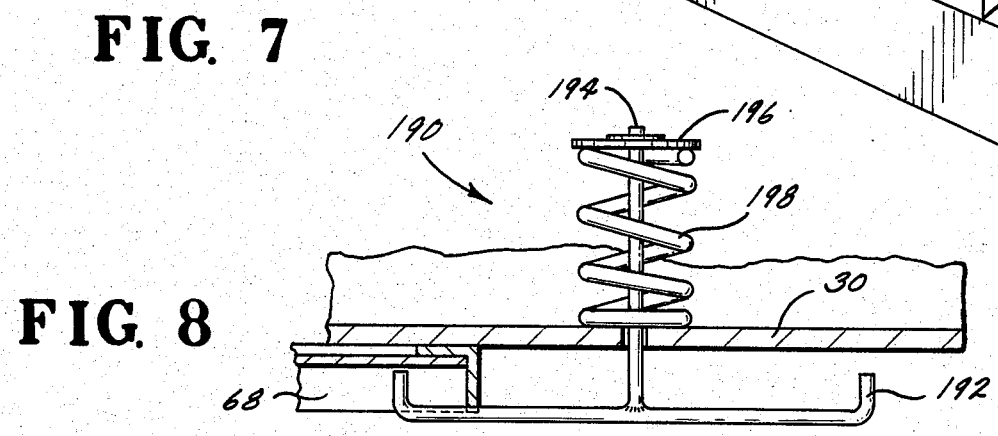
FIG. 8 is a fragmentary, sectional view of the access door restraint mechanism.

Turning now to FIGS. 7 and 8, it will be appreciated that the access doors 68 facilitate loading of the trailer apparatus 10 by providing access to the various devices which restrain the load G within the compartments 42. As such, it is preferable that the access doors 68 be restrained in their open, upright positions. Such restraint is provided by door restraining mechanisms 190. Each of the mechanisms includes a generally T-shaped member 192 which is mounted in the lower peripheral frame rail 30 of the trailer apparatus 10 above and generally intermediate a pair of the access doors 68. Generally concentrically disposed about a shank 194 of the T-shaped member 192 and between the inner surface of the frame rail 30 and a retaining washer 196 is disposed a compression spring 198. The compression spring 198 preloads the T-shaped member 192 but permits rotation about the axis of the shank 194 and retains the T-shaped member 192 captive. It will thus be readily appreciated that the T-shaped member 192 may be positioned in a vertically aligned fashion, the access door 68 or a pair of access doors 68 opened, the T-shaped member pulled beyond the access doors 68, rotated 90° and allowed to fall back toward the frame rail 30 there-by restraining the access door or doors 68 in an open position.

Use and operation of the trailer apparatus 10 according to the instant invention will now be described with reference to all of the drawing figures, particularly FIGS. 2, 3, 4 and 5. Initially, assuming the trailer is configured as illustrated in FIG. 2, the load G of material such as glass sheets or similar material is loaded into the trailer apparatus 10 through the open top and placed on the resilient material 52 of the I-beam arms 50 in either of the compartments 42. The corner guard assemblies 160 are then placed on the load G as illustrated in FIG. 2 and the cargo straps 128 as well as the ratchet clasps 130 are positioned over the load G. If the load G is small in comparison to the total height of the A-frame assemblies 40, it may be preferable to laterally restrain the cargo strap 128 at at a position below the apex of the A-frame assembly 40. In this case, the parallel plates 154 of the cargo strap restraining device are secured in an appropriate pair of apertures 150 by a retaining pin 152. Next, the double hook assembly 136 and the cargo strap 132 is suitably positioned along the I-beam arm 50 and the ratchet cargo strap clasp 130 is tightened to secure the load G.

Longitudinal restraint of the load is, of course, achieved by the transversely oriented restraining beam assemblies 170. The wheels 176 of the transverse beam 172 are inserted into the track 174 through the access notch 182. The cargo strap 184 is then secured to the transverse beam 172 and the ratchet winch 186 is utilized to reel in the cargo strap 184 until the transverse beam 172 is in intimate contact with the edge of the load G thereby providing longitudinal restraint. The open top of the trailer apparatus 10 may then be covered with the tarp 34 and the apparatus 10 is prepared for transport of the load G.

Removal of the load G may be accomplished by following the just delineated steps in reverse order. It should be apparent that throughout either the loading or unloading steps, access to the trailer interior 90 may be also achieved through the hinged, lockable doors 28 and the hinged access doors 68.

Conversion of the trailer apparatus 10 from its configuration illustrated in FIG. 2 for transporting planar material into the configuration illustrated in FIG. 3 for hauling conventional cargo is straightforward. First of all, several preliminary steps such as removing the cargo straps 128 from the apices of the upper members 44 and removal of the transversely oriented beam 172 from the tracks 174 must be accomplished. The significant steps of the conversion, however, relate to the removal of the upper triangular sections 44 and repositioning of the floor panel assemblies 76.

Removal of the upper triangular sections 44 is achieved by first removing each of the spring clips 116 associated with the retaining pins 112 and then removing the retaining pins 112. Then, each of the upper triangular sections 44 may be lifted vertically and separated from the collinear support members 46. The upper triangular sections 44 may then be placed in the compartments 42 for storage during the period they are not used. At this time, all the task specific structures of the trailer apparatus 10 as it is configured for the transport of large planar sheets of material has been removed.

The final step of the conversion involves the activation of the hydraulic piston and cylinder assemblies 84 to pivot the floor panel assemblies 76 from the postions illustrated in FIG. 2 to the positions illustrated in FIG. 3. Given the conventional, straightforward nature of this step, it is believed no further description is necessary. When the floor panel assemblies 76 have pivoted into the positions illustrated in FIG. 3, the trailer apparatus 10 is ready to receive cargo through the hinged, lockable doors 28 at the rear of the trailer in a fully conventional fashion. Conversion of the trailer apparatus 10 back to a trailer suitable for hauling large sheets of planar material proceeds directly in the reverse order through the steps just described.

The foregoing disclosure is the best mode devised by the inventor for practicing this invention. It is apparent, however, that apparatus incorporating modifications and variations will be obvious to one skilled in the art of material transport. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A convertible trailer apparatus comprising, in combination, a longitudinally extending frame, a plurality of A-frame members disposed in spaced apart relationship along said frame, said A-frame members having an upper, demountable section comprising at least a pair of beams diverging from an apex and lower support members aligned with said beams, means for selectively coupling said upper sections to said lower support members, a floor panel movable between a first horizontal position overlying said lower support members and a second position exposing said lower support members and permitting securement of said upper sections to said members.

2. The convertible trailer apparatus of claim 1 further including strap means extending downwardly from said apex of at least one of said demountable sections.

3. The convertible trailer apparatus of claim 2 further including support arms extending perpendicularly from said lower support members and hook means for selectively securing the other end of said downwardly extending strap means to said outwardly extending support arm.

4. The convertible trailer apparatus of claim 1 further including beam means extending transversely across said trailer for longitudinally restraining a load and winch means operably coupled to said beam means for drawing said beam means into restraining contact with said load.

5. The convertible trailer apparatus of claim 1 wherein said floor panel is pivotally secured to said trailer apparatus along an axis parallel to said longitudinally extending frame and includes means for moving said floor panel from said first position to said second position.

6. A convertible trailer apparatus comprising, in combination, a longitudinally extending frame, a floor generally supported by said frame, at least one compartment disposed beneath said floor, a movable floor panel disposed generally over said compartment and movable between a first position substantially coplanar with said floor and a second position providing access to said compartment, a plurality of A-frame members disposed in spaced apart relationship along said frame, said A-frame members having an upper, demountable section comprising at least a pair of diverging beams, said upper section disposed generally above said cargo floor and lower, support members aligned with said diverging beams, said lower support members disposed generally within said compartment and means for selectively coupling said upper sections to said lower support members.

7. The convertible trailer apparatus of claim 6 further including strap means extending downwardly from the apex of at least one of said demountable sections.

8. The convertible trailer apparatus of claim 6 further including beam means extending transversely across said trailer for longitudinally restraining a load and winch means operably coupled to said beam means for drawing said beam means into restraining contact with said load.

9. The convertible trailer apparatus of claim 6 further including trailer sidewall members extending upwardly from said floor, a pair of hinged doors at the rear of said trailer apparatus and removable means for covering the top of said trailer apparatus.

10. The trailer apparatus of claim 6 further including a plurality of door means for providing access from the outside of said trailer apparatus into said compartment.

11. A convertible trailer apparatus comprising, in combination, a longitudinally extending frame, a cargo receiving floor generally supported by said frame, a pair of compartments disposed beneath said cargo receiving floor, a pair of movable floor panels disposed generally over a respective one of said compartments and each movable between a first position substantially coplanar with said floor and a second position providing access to said compartment, a plurality of A-frame members disposed in spaced apart relationship along said frame, said A-frame members having an upper, demountable section comprising at least a pair of beams diverging from an apex, said upper section disposed generally above said cargo floor and lower, support members aligned with said diverging beams, said lower support members disposed generally within one of said compartments and means for selectively coupling said upper sections to said lower support members.

12. The trailer apparatus of claim 11 wherein said coupling means includes interengaging pairs of male and female structures and alignable and cooperating apertures and pins.

13. The trailer apparatus of claim 11 wherein said movable floor panels are pivotally secured to said trailer and each includes a track disposed parallel to said frame.

14. The trailer apparatus of claim 13 further including a transversely disposed beam disposed for motion in said tracks and winch means operably coupled to said beam.

15. The trailer apparatus of claim 11 further including strap means extending downwardly from said apex of at least one of said demountable sections, support arms extending perpendicularly from said lower support members and hook means for selectively securing the other end of said downwardly extending strap means to said outwardly extending support arm.

* * * * *